United States Patent [19]

Coe et al.

[11] Patent Number: 5,354,360
[45] Date of Patent: Oct. 11, 1994

[54] MAGNESIUM A-ZEOLITE FOR NITROGEN ADSORPTION

[75] Inventors: Charles G. Coe, Macungie; James E. MacDougall, Emmaus, both of Pa.; Scott J. Weigel, Goleta, Calif.

[73] Assignee: Air Products and Chemicals, Inc., Allentown, Pa.

[21] Appl. No.: 3,191

[22] Filed: Jan. 11, 1993

[51] Int. Cl.$^5$ .............................................. B01D 53/04
[52] U.S. Cl. ...................................... 95/101; 95/103; 95/105; 95/130; 95/902
[58] Field of Search ................... 55/25, 26, 58, 62, 68, 55/75, 389; 95/95-98, 100-105, 130, 902

[56] References Cited

U.S. PATENT DOCUMENTS

| | | | |
|---|---|---|---|
| 2,882,243 | 4/1959 | Milton | 252/455 |
| 3,078,638 | 2/1963 | Milton | 55/75 X |
| 3,078,640 | 2/1963 | Milton | 55/75 X |
| 3,078,645 | 2/1963 | Milton | 55/75 |
| 3,140,931 | 4/1964 | McRobbie | 55/25 |
| 3,140,932 | 7/1964 | McKee | 55/68 |
| 3,140,933 | 7/1964 | McKee | 55/68 |
| 3,262,890 | 7/1966 | Mitchell et al. | 55/75 X |
| 3,282,028 | 11/1966 | Berlin | 55/75 X |
| 3,313,091 | 4/1967 | Berlin | 55/58 |
| 3,773,690 | 11/1973 | Heinze et al. | 252/455 Z |
| 4,056,370 | 11/1977 | Heinze et al. | 55/75 X |
| 4,137,054 | 1/1979 | Miyake et al. | 55/75 X |
| 4,322,394 | 3/1982 | Mezey et al. | 423/244 |
| 4,329,158 | 5/1982 | Sircar | 55/26 |
| 4,461,631 | 7/1984 | Itabashi et al. | 55/75 X |
| 4,481,018 | 11/1984 | Coe et al. | 55/68 |
| 4,544,378 | 10/1985 | Coe et al. | 55/68 |
| 4,557,736 | 12/1985 | Sircar et al. | 55/62 |
| 4,746,332 | 5/1988 | Tomomura et al. | 55/75 X |
| 4,810,265 | 3/1989 | Lagree et al. | 55/26 |
| 4,859,217 | 8/1989 | Chao | 55/68 |
| 4,950,312 | 8/1990 | Puppe et al. | 55/68 |
| 4,964,889 | 10/1990 | Chao | 55/75 X |
| 5,152,813 | 10/1992 | Coe et al. | 55/26 |
| 5,174,979 | 12/1992 | Chao et al. | 423/715 |

FOREIGN PATENT DOCUMENTS

| | | |
|---|---|---|
| 131166 | 7/1978 | German Democratic Rep. . |
| 239536 | 1/1986 | German Democratic Rep. . |
| 61-153138 | 7/1986 | Japan . |
| 1431686 | 4/1976 | United Kingdom . |

OTHER PUBLICATIONS

Schöllner, R et al; "Investigations on the Adsorptive Separation of Air", Jun. 30, 1980.

*Primary Examiner*—Robert Spitzer
*Attorney, Agent, or Firm*—Geoffrey L. Chase; James C. Simmons; William F. Marsh

[57] ABSTRACT

The present invention is directed to a process for separating nitrogen from gas mixtures containing nitrogen and less strongly adsorbed components such as oxygen, hydrogen, argon or helium at ambient temperatures or above by use of a magnesium exchanged, sodium A-zeolite in a preferred level of magnesium exchange and an appropriate pressure range for adsorption and desorption of bulk gases which provides improved recovery and reduced bed size factor.

16 Claims, 1 Drawing Sheet

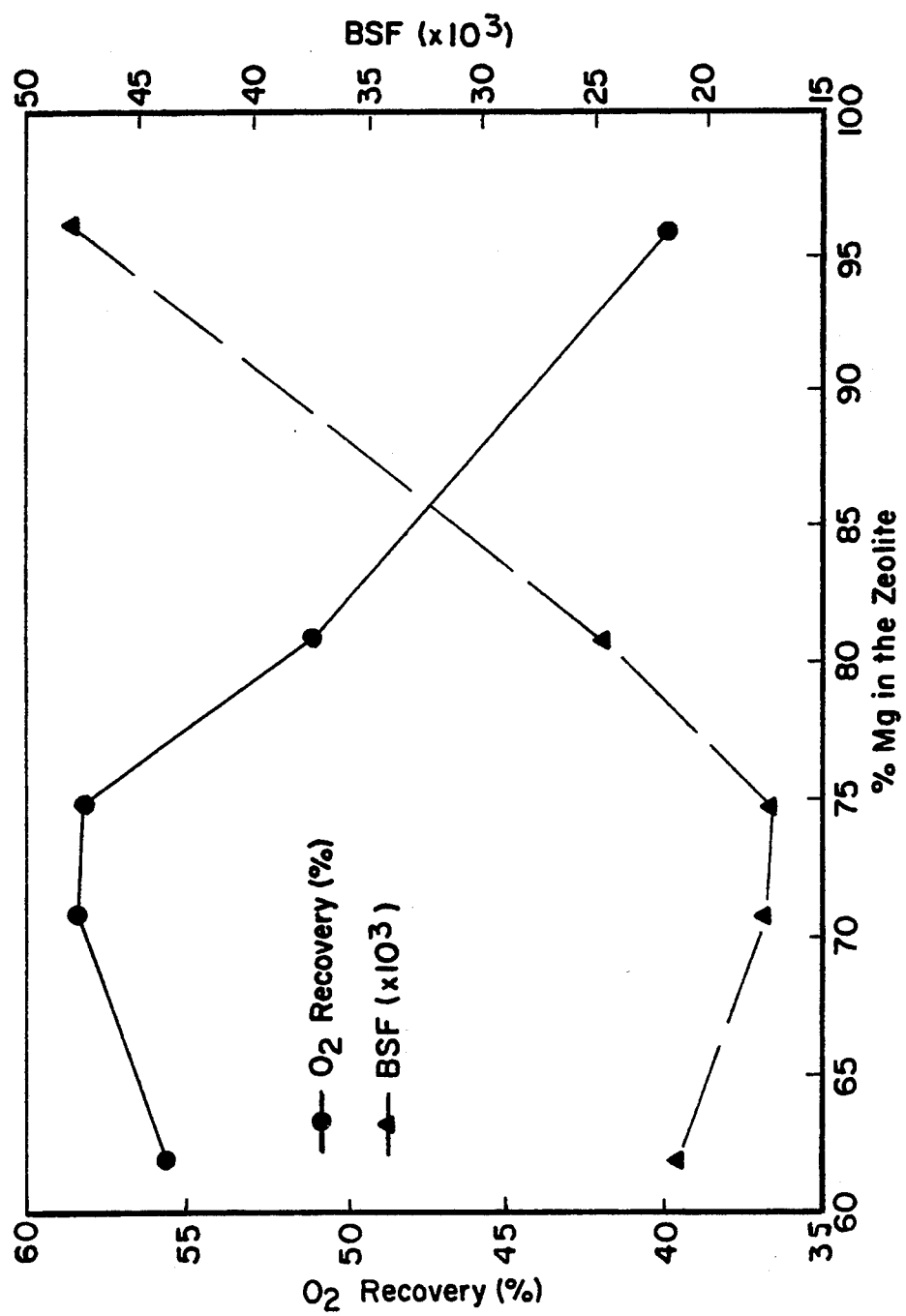

MAGNESIUM A-ZEOLITE FOR NITROGEN ADSORPTION

FIELD OF THE INVENTION

The present invention is directed to a process using adsorbents which are selective to the adsorption of nitrogen over a less readily adsorbed component in the gas mixture. More specifically, the present invention is directed to a process using partially magnesium exchanged A-zeolite which more readily adsorbs nitrogen in contrast to oxygen in air.

BACKGROUND OF THE PRIOR ART

Separation of gas mixtures containing nitrogen are important industrial processes allowing for the production of enriched oxygen and nitrogen products. These processes are practiced on a variety of scales ranging from less than 1 to greater than 100 tons per day. In the past, the primary means of air separation was by cryogenic processing. For intermediate volumes of oxygen product or production in remote areas far away from cryogenic supplies, stand-alone pressure swing adsorption units are providing significant opportunities for expanded markets.

The removal of nitrogen from air by adsorptive separation uses nitrogen selective zeolites which preferentially adsorb higher amounts of nitrogen than oxygen under a wide variety of equilibrium conditions. Oxygen enriched product made using nitrogen selective adsorbent zeolites are typically produced at elevated pressures during the air feed step, whereas the nitrogen product is formed during the desorption step and is typically at lower pressure. For a given oxygen purity, the recovery and efficiency of the process is directly related to the process scheme employed and the intrinsic adsorption properties of the zeolite.

Depending on the zeolite structure and composition, their effectiveness for adsorptive separation of air can vary over a wide range. The use of crystalline zeolitic molecular sieves in pressure swing adsorption processes for air separation are well known. In U.S. Pat. No. 3,140,931 the use of crystalline zeolitic molecular sieve material having apparent pore sizes of at least 4.6 angstroms for separating oxygen-nitrogen mixtures at subambient temperatures is disclosed. In U.S. Pat. No. 3,140,932 the strontium, barium, or nickel ion exchanged forms of X-zeolite are set forth.

In U.S. Pat. No. 3,313,091 the use of A-zeolite and X-zeolite adsorbents exchanged with Group II metal cations, such as: magnesium, calcium, strontium and barium are set forth. This patent describes ambient temperature operation at high cation exchange levels, but reports only marginal performance in its Table 1 results. It suggests that the greater cation exchange level achievable is best for performance.

U.S. Pat. Nos. 4,481,018 and 4,544,378 demonstrate an improved performance of faujasite composition containing divalent cations provided they are activated in such way that a preponderance of the polyvalent cations are in the dehydrated/dehydroxylated state. Properly activated materials showed the expected increase in nitrogen capacity and nitrogen/oxygen selectivity with increase in cation charged density from barium to strontium to calcium. In addition, these patents note the increasing calcium exchange level and greatly enhanced nitrogen/oxygen selectivity only for calcium exchange levels above 50%.

U.S. Pat. No. 4,557,736 discloses that the binary ion exchange forms of X-zeolite wherein between 5 and 40% of the available ion sites are occupied by calcium and between 60 and 95% of the sites are occupied by strontium exhibit higher nitrogen capacities at 3 to 3.5 atmospheres without adverse affects on nitrogen/oxygen selectivity or large increases in heat of adsorption compared to the single ion exchange X-zeolite with calcium or strontium.

The use of X-zeolites exchanged with monovalent cations for air separation is also known in the art. In U.S. Pat. No. 3,140,933 the use of lithium X-zeolite to separate oxygen-nitrogen mixtures at feed pressures between 0.5 and 5 atmospheres and a temperature between about 30° C. and 150° C. is disclosed. In U.S. Pat. No. 4,859,217 a process for selectively adsorbing nitrogen using X-zeolite having a framework silicon/aluminum molar ratio not greater than 1.5 and having at least 88% of its aluminum oxide tetrahedral units associated with lithium cations is set forth.

The use of A-zeolite for oxygen pressure swing adsorption processes which has about 70% or more of its exchangeable cations in the calcium form (commonly called 5A) is well known. This has been the most widely used adsorbent for the production of oxygen from sorptive separations on both small scales and large scale as an alternative to cryogenic production. Many improvements in the formulation and manufacture of 5A zeolite have provided effective granular, beaded or pelleted adsorbents for oxygen production. These include optimizing the activation processes Japanese 61153138-A, forming binderless granules British 1431686 and U.S. Pat. No. 3,773,690, and using nonreactive binders such as silica U.S. Pat. No. 4,950,312. Besides improvements in the 5A adsorbent formulation numerous process improvements have been developed. Recent U.S. patents describing improved oxygen processes such as U.S. Pat. No. 4,810,265 or U.S. Pat. No. 4,329,158 contain many of the relevant preferences.

In spite of all the work on A-zeolites containing calcium, there are only a few reports of the effects of magnesium containing A-zeolites on air separation properties. U.S. Pat. No. 2,882,243 discloses the utility of A-zeolites as adsorbents. However, no reference is made to the utility of magnesium containing A-zeolites for air separation and all references to any cation form are at temperatures well below ambient conditions. The use of magnesium containing A-zeolites for air separation at ambient conditions was first reported in a process patent for a vacuum swing adsorption process in U.S. Pat. No. 3,313,091. Work was reported by R. Schollner in publications and patents from East Germany between the period of 1978 to 1986. These works studied the influence of alkaline earth and alkali metal cation forms of A-zeolite for air separation, and initially carried out gas chromatograph studies showing that the high charge density of magnesium in A-zeolite greatly improves selectivity for nitrogen over oxygen. See R. Schollner, R. Broddack, M. Jusek, translation from Z. Phys Chemie, Leipzig, 262 (1981) to pages 362 to 368. This work is the first disclosure of the high nitrogen-oxygen separation factors obtainable on highly magnesium exchanged A-zeolite. Schollner recognized the importance of this observation and stated that highly exchanged magnesium A-zeolite was well suited for air separation. Schollner demonstrated air separation over magnesium, sodium A-zeolite using frontal chromatography and disclosed a process for the separation of oxygen and nitrogen from gas mixtures over magnesium A-zeolites having at least 30% magnesium and carried out in a process at temperatures less than or equal to 20° C. at a pressure of 1 to 10 atmospheres. See East German patent 131,166. Schollner also demonstrated mixed magnesium, lithium A-zeolite. Finally, Schollner discloses a single step ion exchange process for exchanging calcium and magnesium on an A-zeolite useful for separation of air in an adsorptive separation. See East German 239,536.

U.S. Pat. No. 5,152,813 discloses calcium as strontium exchanged lithium X-zeolite as adsorbents for air separation.

The various reports of interest in magnesium exchanged A-zeolites fail to report a high performance magnesium A-zeolite having significant increase in performance over the standard adsorbent for nitrogen adsorption or oxygen production in pressure swing adsorption comprising calcium A-zeolite more widely known as 5A zeolite. The present invention overcomes the shortcomings of the prior art in a process providing high performance in air separation using a specially prepared magnesium A-zeolite as set forth below.

BRIEF SUMMARY OF THE INVENTION

The present invention is a process for selectively adsorbing nitrogen from a gas mixture containing nitrogen and at least one less strongly adsorbed component in a bulk gas separation which comprises contacting the gas mixture at a temperature above 20° C. with a zone of an adsorbent which is selective for the adsorption of nitrogen, comprising an A-zeolite having an ion exchange of the exchangeable ion content with between approximately 60% and 80% magnesium, selectively adsorbing nitrogen on the adsorbent, passing the gas mixture less the adsorbed nitrogen out of the zone and desorbing the adsorbed nitrogen from the adsorbent at a desorption pressure lower than an adsorption pressure.

Preferably, the process is conducted at an adsorption pressure in the range of 17.4 psia to 65 psia and a desorption pressure down to a pressure in the range of 1.55 psia to 16.7 psia.

Preferably, the zeolite is ion exchanged with magnesium to approximately 70% to 75%. More preferably, the zeolite is ion exchanged with approximately 75% magnesium.

Preferably, the zeolite is thermally activated to remove a substantial portion of its zeolitic water in such a manner as to produce a preponderance of its magnesium ions in a dehydrated/dehydroxylated state under conditions to minimize the water vapor pressure in the gaseous environment in contact with said zeolite throughout the thermal activation step to less than about 6 psia at temperatures above 150° C. such that the resulting component recovery and bed size factor of the resulting zeolite for the separation of a mixture of said component and nitrogen is substantially improved over a zeolite that has not undergone such a thermal activation step.

Preferably, the zeolite is subjected to an initial drying step at temperatures of no greater than 200° C. to remove a substantial portion of the surface water before carrying out the thermal activation step.

Preferably, the zeolite is thermally activated to remove a substantial portion of the zeolitic water and the hydration sphere surrounding the zeolite cations therein by subjecting the exchanged zeolite containing up to about 30% by weight water to a vacuum of less than about 1.47 psia and heating the zeolite at a temperature range of 0.1° to 40° C./min. up to temperatures in the range of about 400° C. to 500° C. and maintaining the zeolite at these temperatures for a period of at least about 6 hours.

Preferably, the gas mixture contains nitrogen and oxygen. More preferably the gas mixture is air.

Preferably, the silicon to aluminum ratio is approximately one.

Preferably, an oxygen and nitrogen containing gas mixture contacts a zone of said adsorbent, the nitrogen is selectively adsorbed and the oxygen passes through the zone and is recovered as an oxygen enriched product.

Preferably, the oxygen product has a purity of at least approximately 90% oxygen.

Preferably, the gas mixture to the process is at least approximately 25° C.

Preferably, the process is operated through a series of steps comprising: adsorption during which the gas mixture contacts the adsorbent, nitrogen is selectively adsorbed and oxygen passes through the zone as a product; depressurization during which the gas mixture contact is discontinued and the zone is reduced in pressure to desorb the nitrogen; and repressurization during which oxygen product or the gas mixture repressurizes the zone to the adsorption pressure.

Preferably, the adsorption pressure is in the range of approximately 35 to 65 psia. Preferably the desorption is conducted down to a pressure in the range of approximately 14.7 to 16.7 psia.

Alternately, the zone is operated through a series of steps comprising: adsorption during which the gas mixture contacts the adsorbent, nitrogen is selectively adsorbed and oxygen passes through the zone as product; depressurization during which the gas mixture contact is discontinued and the zone is reduced in pressure to desorb the nitrogen; evacuation during which the nitrogen is further desorbed to below ambient pressure; and repressurization during which oxygen product or the gas mixture repressurizes the zone to the adsorption pressure.

In this alternate, preferably the adsorption pressure is in the range of approximately 17.4 to 31 psia.

In this alternate, preferably the evacuation is conducted down to a desorption pressure in the range of approximately 1.55 to 7.7 psia.

BRIEF DESCRIPTION OF THE DRAWING

The drawing is a graph of oxygen recovery and bed size factor for the percent of magnesium exchange in a sodium A-zeolite.

DETAILED DESCRIPTION OF THE INVENTION

The present invention has demonstrated a particular range of magnesium exchange level in an A-zeolite which provides the highest performance in conducting a nitrogen adsorptive separation of a gas mixture, such as air, particularly when used in the context of a standard three adsorbent bed oxygen vacuum swing adsorption process (VSA) in a given range of adsorption and desorption pressures. It has also been demonstrated in the present invention that this performance is enhanced by increasing the air feed temperature to the process above 20° C. The performance of the present invention is enhanced in the pressure regime conducted at an adsorption pressure in the range of 17.4 psia to 65 psia and a desorption pressure down to a pressure in the range of 1.55 psia to 16.7 psia.

A preferred use for the at least binary ion exchanged A-zeolites of the present invention is the separation of nitrogen from oxygen in air using a pressure swing adsorption ("PSA") or vacuum swing adsorption ("VSA") process. In such a process, an adsorbent bed or zone comprising ion exchanged magnesium A-zeolite is initially pressurized with oxygen. A gas stream comprising nitrogen and oxygen, such as air at a temperature above 20° and up to 50° C. and a pressure between 17.4 psia and 65 psia, is passed over the adsorbent bed. A portion of the nitrogen in the gas stream is adsorbed by said ion exchanged zeolites, thereby producing an oxygen-enriched product stream. The nitrogen containing adsorbent bed is subsequently depressurized and/or evacuated to a pressure in the range of 1.55 psia to 16.7 psia, with the option of being purged with oxygen enriched gas to produce a nitrogen enriched stream. The bed or zone is then repressurized with product oxygen and adsorption can be reinitiated. Preferably, in a pressure swing process the adsorption pressure is in the range of approximately 35 to 65 psia, while the desorption is conducted down to a pressure in the range of approximately 14.7 to 16.7 psia. In a vacuum swing process alternate, preferably the adsorption pressure is in the range of approximately 17.4 to 31 psia, while the evacuation is conducted down to a desorption pressure in the range of approximately 1.55 to 7.7 psia.

The performance is further enhanced by a careful drying and activation of the zeolite to remove water at low water partial pressures. The combination result of the present invention of using magnesium A-zeolite at temperatures above 20° C., the appropriate pressure regime and adhering to a particular pressure range and preferably careful dehydration/dehydroxylation drying activation step of the zeolite is a high recovery and lower bed size factor than any magnesium A-zeolite previously reported in the prior art.

The ion exchange is accomplished by contacting the sodium or mixed sodium and potassium A-zeolite with a solution of a soluble salt of the magnesium ion to be exchanged, such as chloride, nitrate, sulfate or acetate. Other methods of ion exchange are contemplated and can be used for the present invention.

A process model was used to simulate a standard oxygen VSA process cycle at chosen pressures and feed temperature. The model is based on global equilibrium, that is, it assumes no spatial concentration gradients and complete bed utilization and is referred to as GEM. Multi component equilibria are estimated by ideal adsorbed solution theory (IAST, described by A. L. Meyers and J. M. Prausnitz in the American Institute of Chemical Engineers Journal, (1965) vol. 11, p. 121) and heat effects are included. Input for the program includes isotherms for nitrogen and oxygen at two temperatures and adsorbent physical properties including bulk density, void volume and heat capacity. The two major performance factors obtained from the simulations are bed size factor and recovery of oxygen. Lower bed size factor and higher recovery indicate improved performance. All GEM predictions are for an oxygen vacuum swing adsorption process cycle with a feed pressure of 1000 torr and an evacuation pressure of 300 torr. The results are graphed in the drawing which shows an optimum oxygen recovery in the area of 70 to 75% magnesium exchange in an A-zeolite having an Si/Al=1.0 and with a corresponding minimum for bed size factor in that same range. Oxygen recovery is the fraction of the oxygen product obtained from the total moles of oxygen present in the feed gas mixture. For a given process, the recovery is directly related to the power requirements. High recovery indicates low power consumption relative to corresponding lesser recoveries. In contrast, bed size factor is defined as the pounds of adsorbent per pound mole of oxygen product recovered (lbs. adsorbent/lb. mole $O_2$), and is a rough determination of capital costs of a separation process for a given amount of gaseous product produced. Capital costs are minimized with a lesser bed size factor number. The data shows that the materials of the present invention have much higher oxygen recovery and a relatively lower bed size factor and therefore less capital cost than the pure sodium or highly exchanged magnesium A-zeolites.

An important aspect in achieving the performance of the present invention is not only the percentage of magnesium cation exchange and the temperature of process operation, but the range of pressures that adsorption and desorption are conducted at, as well as activation subsequent to cation exchange. The exchanged adsorbent must be dehydrated before being used for gas separation using a thermal activation step. Such a thermal activation step can be achieved by a number of different methods in which the zeolitic water in the hydration sphere is associated with the extra-framework cation are carefully removed and the amount of water in the gaseous environment in contact with the zeolite during this step is minimized. That is, the partial pressure of water making such contact should be less than about 6 psia, preferably not more than about 1.47 psia at temperatures above about 150° C.

One method of accomplishing this is to subject the exchanged A-zeolite composition, which contains up to about 30 wt. % by weight of 10 water, to pressures in the range of about 1.47 to 147 psia while maintaining sufficient molar mass velocities and residence times of a flow of a non-reactive purge gas, that is a molar mass velocity of about 0.5 to 100 kg mole/$m^2$ hour and a residence time of no greater than about 2.5 minutes, and then heating the composition at a temperature ramp of 0.1° to 40° C. per minute up to a temperature of at least 300° C. and no greater than about 650° C. The residence time is defined as the volume of the column or other unit used to thermally activate the zeolite divided by the volumetric flow rate of the purge gas at the standard temperature and pressure. The molar mass velocity is the flow rate of the purge gas divided by the cross-sectional area of the column used for thermal activation. The purpose of the purge gas is to provide a sufficient mass for efficient heat and mass transfer from the surface of the adsorbent at a residence time to limit the water in the purge gas exiting the adsorbent bed to the desired lower limits. The minimum residence time is determined by economic and process constraints, although times of less than 0.0025 minutes would appear to provide no advantages.

Another method of thermal activation is to conduct the activation under less than about 1.47 psia vacuum without the use of the purge gas and to heat the material to the desired activation temperature at a ramp temperature rate from 0.1° to 40° C. per minute.

Still another method available for thermal activation of zeolitic adsorbents is the use of microwave radiation, conditions that are described in U.S. Pat. No. 4,322,394, of which the description of the microwave procedure for thermally activating zeolites is incorporated herein by reference.

The present invention will now be set forth in greater detail with reference to several examples. The following examples specifically demonstrate that divalent magnesium cations in A-zeolite are useful in air separation. All samples were activated in vacuum at 1° C./min to 150° C. followed by a 2 hr. hold, then 0.5° C./min to 250° C. followed by a 2 hr hold, and finally 0.5° C./rain to 400° C. and held for 12 hr. The adsorption isotherms were measured on a volumetric high pressure adsorption unit.

EXAMPLE 1

Effect of Mg Loading

Mg,Na A-zeolite samples varying in magnesium exchange level from 53% to 81% were prepared from Linde Na A-zeolite powder using standard aqueous exchange procedures. Table 1 below summarizes the specific conditions used for the preparation of each of these samples. Despite several attempts, magnesium exchange levels greater than 85% could not be obtained using multiple batch exchanges with dilute $MgCl_2$ solutions. The 96-Mg, Li A-zeolite sample was prepared by aqueous back exchange of Li A-zeolite powder with $MgCl_2$. The 96-Mg, Li A-zeolite was obtained from four aqueous exchanges at reflux using 87 cc 0.05M $MgCl_2$/g Li A-zeolite.

TABLE 1

| Mg Exchange of NaA | | | | |
|---|---|---|---|---|
| $MgCl_2$ Molarity | $ccMgCl_2/g$ | Temperature (°C.) | No. of Exchanges | Mg/Al × 100% |
| 0.050 | 87 | 100 | 4 | 96 |
| 0.025 | 174 | 65 | 3 | 81 |
| 0.30 | 20 | 25 | 5 | 75 |
| 0.30 | 147 | 100 | 2 | 71 |
| 0.30 | 20 | 25 | 3 | 63 |
| 0.30 | 20 | 25 | 1 | 53 |

High pressure nitrogen and oxygen isotherms were measured and the data used in a global equilibrium model (GEM) to predict binary $N_2/O_2$ selectivities and performance in a standard 3-bed $O_2$ VSA process for Mg-containing A-zeolite compared to the best calcium A-zeolite available. Table 2 gives the results. The CaA-zeolite was prepared from Linde NaA-zeolite powder at ambient temperature by 6 exchanges with 20 cc 0.4M $CaNO_3$/g NaA-zeolite.

TABLE 2

| GEM Performance Predictions for $O_2$ VSA | | | |
|---|---|---|---|
| Adsorbent | $N_2/O_2$ Selectivity | Predicted $O_2$ Recovery (%) | Bed Sizing Factor × $10^3$ |
| 99-CaA | 4.8 | 51.8 | 18.8 |
| 63-MgNaA | 6.6 | 55.6 | 21.5 |
| 75-MgNaA | 7.6 | 58.2 | 17.3 |
| 81-MgNaA | 8.5 | 51.1 | 24.7 |

The above results show that surprisingly at temperatures above 20° C. (the feed gas in GEM is 24° C.) there is a significant improvement in $O_2$ recovery (58.2 vs. 51.8) obtained using Mg-containing A-zeolites, instead of the calcium form. Note also that this improvement is achieved without needing to completely convert the A-zeolite into the $Mg^{2+}$ form. From the available data it appears that the preferred Mg loading is about 75%. For the 75-MgNaA-zeolite, the increase in the $O_2$ recovery compared to CaA-zeolite is possible without increasing the bed size factor which is directly related to the quantity of adsorbent required for a certain production level at a given purity. Increasing the Mg loading to 81% results in a dramatic decrease in the predicted recovery presumably due to the increased curvature of the $N_2$ isotherm lowering the $N_2$ working capacity even though the $N_2$ selectivity at feed conditions increases. This suggests for the first time that for $O_2$ VSA applications there may be an optimum level of $Mg^{2+}$ desirable. The only previous evaluation of air selectivity vs. Mg level in A-zeolite was done in the Henry law region (low pressure) using gas chromatography (GC).

EXAMPLE 2

Effect of Temperature

To define the benefit of air separation at temperatures >20° C. for Mg-containing A-zeolites, a series of GEM evaluations were carried out for three samples of MgNaA-zeolite at different exchange levels. The influence of feed air temperature on the performance of a standard 3-bed $O_2$ VSA process could be determined using the GEM model for 81%, 75% and 63% Mg exchange of NaA-zeolite powder. The results for this study are shown in Table 3.

TABLE 3

| Predicted $O_2$ VSA Performance vs. Feed Air Temperature (Corrected for Pre-treatment Sieve) | | | |
|---|---|---|---|
| Feed Temp. (°F./°C.) | Selectivity | Recovery | BSF × $10^3$ |
| 63% MgNaA | | | |
| 45/7 | 7.28 | 52.6 | 18.7 |
| 60/15 | 6.97 | 54.6 | 18.4 |
| 75/24 | 6.56 | 56.3 | 18.4 |
| 90/32 | 6.10 | 57.3 | 18.9 |
| 115/46 | 5.31 | 57.4 | 21.1 |
| 75% MgNaA | | | |
| 45/7 | 8.34 | 53.9 | 17.9 |
| 60/15 | 8.04 | 56.3 | 17.5 |
| 75/24 | 7.60 | 58.3 | 17.3 |
| 90/32 | 7.08 | 59.6 | 17.5 |
| 115/46 | 6.16 | 60.3 | 19.1 |
| 81% MgNaA | | | |
| 45/7 | 8.64 | 45.4 | 27.6 |
| 60/15 | 8.53 | 48.4 | 26.1 |
| 75/24 | 8.21 | 51.2 | 24.6 |
| 90/32 | 7.69 | 53.6 | 23.4 |
| 115/46 | 6.61 | 55.8 | 23.1 |

In the preferred composition, 75-MgNaA-zeolite, increasing the process temperature from 24° to 32° C. actually improves the predicted $O_2$ recovery without significantly increasing the bed size factor (BSF). Higher temperatures allow further improvement in $O_2$ recovery, but require larger adsorbent quantities indicated by the higher BSF. Increasing the Mg content alters the effect of increasing the air feed temperature. The GEM results show that the 81-MgNaA improves in both $O_2$ recovery and BSF with higher air feed temperature; whereas, the lower Mg loading displays an optimum BSF at the 24° F. Also note that other factors beside selectivity are important to the process since increasing selectivity does not improve performance. This analysis would suggest that the amount of $Mg^{2+}$ exchanged into the A-zeolite strongly influences the process conditions providing the best balance between the various parameters.

N₂ Capacity Comparison

Table 4 below compares the $N_2$ and $O_2$ data for the Berlin patent (U.S. Pat. No. 3,313,091) to that obtained for 75% MgNaA-zeolite prepared under controlled conditions and properly dehydrated such that all the magnesium cations are present in the dehydrated/dehydroxylated state. The comparison was made by converting the data given in Table 1 of Berlin into similar units used to measure isotherms for the present invention's MgNaA-zeolite adsorbents. (This was possible because the temperatures for the two data sets differed by only 2 degrees.) There is a significant difference in the amounts of $N_2$ and $O_2$ adsorbed, as well as the ratio of $N_2$ to $O_2$ capacities at any given pressure for the MgNaA-zeolite adsorbents of the prior art vs. those prepared per the present invention. The information given in Berlin is insufficient to determine if these lower capacities are due to the degree of Mg exchange or the dehydration conditions used.

TABLE 4

Comparison of MgNaA Adsorption Capacities

| Pressure (psig) | Pressure (Atm) | Berlin MgNaA | Invention 75-MgNaA |
|---|---|---|---|
| $N_2$ Capacity at 22° C. (±1° C.) [ccSTP/g] | | | |
| 5 | 1.34 | 15.5 | 23.4 |
| 15 | 2.02 | 19.3 | 28.3 |
| 30 | 3.04 | 24.3 | 33.5 |
| $O_2$ Capacity at 22° C. (±1° C.) [cc STP/g] | | | |
| 5 | 1.34 | 4.3 | 5.5 |
| 15 | 2.02 | 6.6 | 8.3 |
| 30 | 3.04 | 10.3 | 12.1 |

With reference to Table 4 it is apparent that the present invention represents a decidedly unexpected and superior performance over the magnesium containing A-zeolites reported in the Berlin Patent. In addition, the restriction of the Schollner prior art to temperatures below 20° C. has been found to be unexpectedly and surprisingly inappropriate for the improved magnesium A-zeolites of the present invention which actually enjoy superior performance at ambient and above ambient temperatures, which are the temperatures most readily achievable in pressure swing adsorption and vacuum swing adsorption units located in most temperature zones in industrial sites. In addition, the Schollner literature article disclosing its very low GC pressure range (0.02 psia) is also inappropriate and is not relevant for the pressures utilized in commercial bulk gas separations, such as the present invention. Therefore, it is believed that the present invention provides a decided departure from the prior art in magnesium exchanged A-zeolites in nitrogen adsorption separations.

The present invention has been set forth with regard to several preferred embodiments, however, the full scope of the invention should be ascertained from the claims which follow:

We claim:

1. A process for selectively adsorbing nitrogen from a gas mixture containing nitrogen and at least one less strongly adsorbed component in a bulk gas separation which comprises contacting the gas mixture at a temperature above 20° C. at an adsorption pressure in the range of 17.4 psia to 65 psia with a zone of an adsorbent which is selective for the adsorption of nitrogen, comprising an A-zeolite having an ion exchange of the exchangeable ion content with between approximately 60% and 80% magnesium, selectively adsorbing nitrogen on the adsorbent, passing the gas mixture less the adsorbed nitrogen out of the zone and desorbing the adsorbed nitrogen from the adsorbent at a desorption pressure lower than an adsorption pressure in the range of 1.55 psia to 16.7 psia wherein the zeolite is thermally activated to remove a substantial portion of its zeolitic water in such a manner as to produce a preponderance of a its magnesium ions in a dehydrated/dehydroxylated state under conditions to minimize the water vapor pressure in the gaseous environment in contact with said zeolite throughout the thermal activation step to less than about 6 psia at temperatures above 150° C. such that the resulting component recovery and bed size factor of the resulting zeolite for the separation of a mixture of said component and nitrogen is substantially improved over a zeolite that has not undergone such a thermal activation step.

2. The process of claim 1 wherein the zeolite is ion exchanged with magnesium to approximately 70% to 75%.

3. The process of claim 1 wherein the zeolite is ion exchanged with approximately 75% magnesium.

4. The process of claim 1 wherein the zeolite is subjected to an initial drying step at temperatures of no greater than 200° C. to remove a substantial portion of the surface water before carrying out said thermal activation step.

5. The process of claim 1 wherein the gas mixture is air.

6. The process of claim 1 wherein the Si/Al ratio is approximately 1.

7. The process of claim 1 wherein an oxygen and nitrogen containing gas mixture contacts a zone of said adsorbent, the nitrogen is selectively adsorbed and the oxygen passes through the zone and is recovered as an oxygen enriched product.

8. The process of claim 7 wherein the oxygen product has a purity of at least approximately 90% oxygen.

9. The process of claim 8 wherein the desorption is conducted down to a pressure in the range of approximately 14.7 to 16.7 psia.

10. The process of claim 8 wherein the zone is operated through a series of steps comprising: adsorption during which the gas mixture contacts the adsorbent, nitrogen is selectively adsorbed and oxygen passes through the zone as a product; depressurization during which the gas mixture contact is discontinued and the zone is reduced in pressure to desorb the nitrogen; evacuation during which the nitrogen is further desorbed to below ambient pressure; and repressurization during which oxygen product or the gas mixture repressurizes the zone to the adsorption pressure.

11. The process of claim 10 wherein the adsorption pressure is in the range of approximately 17.4 to 31 psia.

12. The process of claim 10 wherein the evacuation is conducted down to a pressure in the range of approximately 1.55 to 7.7 psia.

13. The process of claim 7 wherein the gas mixture to the process is at least approximately 25° C.

14. The process of claim 7 wherein the zone is operated through a series of steps comprising: adsorption during which the gas mixture contacts the adsorbent, nitrogen is selectively adsorbed and oxygen passes through the zone as a product; depressurization during which the gas mixture contact is discontinued and the zone is reduced in pressure to desorb the nitrogen; and repressurization with oxygen product or the gas mixture to the adsorption pressure.

15. The process of claim 14 wherein the adsorption pressure is in the range of approximately 35 to 65 psia.

16. A process for selectively adsorbing nitrogen from a gas mixture containing nitrogen and at least one less strongly adsorbed component in a bulk gas separation which comprises contacting the gas mixture at a temperature above 20° C. with a zone of an adsorbent which is selective for the adsorption of nitrogen, comprising an A-zeolite having an ion exchange of the exchangeable ion content with between approximately 60% and 80% magnesium, selectively adsorbing nitrogen on the adsorbent, passing the gas mixture less the adsorbed nitrogen out of the zone and desorbing the adsorbed nitrogen from the adsorbent at a desorption pressure lower than an adsorption pressure wherein the zeolite is thermally activated to remove a substantial portion of the zeolitic water and the hydration spheres surrounding the zeolite cations therein by subjecting said exchanged zeolite containing up to about 30% by weight water to a vacuum of less than about 1.47 psia and heating said zeolite at a temperature ramp of 0.1° to 40° C./min. up to temperatures in the range of about 400° to 500° C. and maintaining said zeolite at these temperatures for a period of at least about 6 hours.

* * * * *